United States Patent
Mleczko et al.

(10) Patent No.: US 11,911,913 B2
(45) Date of Patent: Feb. 27, 2024

(54) METHOD FOR TRANSFERRING A POURABLE MEDIUM

(71) Applicant: Bayer Aktiengesellschaft, Leverkusen (DE)

(72) Inventors: Leslaw Mleczko, Dormagen (DE); Armin Schweiger, Bergisch Gladbach (DE); Kathrin Wegener, Neuss (DE); Carl-Helmut Coulon, Bonn (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 452 days.

(21) Appl. No.: 17/297,370

(22) PCT Filed: Nov. 21, 2019

(86) PCT No.: PCT/EP2019/082058
§ 371 (c)(1),
(2) Date: May 26, 2021

(87) PCT Pub. No.: WO2020/109126
PCT Pub. Date: Jun. 4, 2020

(65) Prior Publication Data
US 2022/0024040 A1 Jan. 27, 2022

(30) Foreign Application Priority Data
Nov. 28, 2018 (EP) .................................. 18208802

(51) Int. Cl.
*B25J 9/16* (2006.01)

(52) U.S. Cl.
CPC .......... *B25J 9/1679* (2013.01); *B25J 9/1628* (2013.01); *G05B 2219/31376* (2013.01); *G05B 2219/39001* (2013.01)

(58) Field of Classification Search
CPC .................. B25J 9/1679; B25J 9/1628; G05B 2219/31376; G05B 2219/39001
See application file for complete search history.

(56) References Cited

U.S. PATENT DOCUMENTS 4,630,755 A * 12/1986 Campbell ............ G05D 7/0605
222/196
4,976,377 A * 12/1990 Higuchi ............... G01G 13/285
706/900

(Continued)

FOREIGN PATENT DOCUMENTS

CN 106799734 A 6/2017
CN 106799737 A 6/2017

(Continued)

OTHER PUBLICATIONS

International Search Report dated Feb. 13, 2020, for PCT Application No. PCT/EP2019/082058 filed on Nov. 21, 2019, 6 pages.

(Continued)

*Primary Examiner* — Jeff A Burke
*Assistant Examiner* — Mohamad O El Sayah
(74) *Attorney, Agent, or Firm* — MORRISON & FOERSTER LLP (57) ABSTRACT

The invention relates to a method for transferring a pourable medium (10) from a first vessel (12) into a second vessel (14), by means of a robot arm (16), wherein a movement 118) of the robot arm (16) can be controlled by at least one movement parameter (BP), including, inter alia, the following method steps: d) determining the mass of the medium (10) transferred into the second vessel (14) as an actual filling mass (IFM), and also the variation over time of the actual filling mass (IFM) of the medium (30; as an actual mass flow (IMS), by means of a balance 124, c) calculating a correcting mass flow (StMS) as a correcting variable (26) of a first control circuit (28) while taking into account the (Continued)

actual filling mass (FM) and the intended filling mass (SFM), f) using the correcting variable (26) of die first control circuit (28) as a reference variable (30) of a second control circuit (32) for the purpose that the calculated correcting mass flow (StMS) is used as the intended mass flow (SMS), g) calculating the at least one movement parameter (BP) of the robot arm (16) as a correcting variable (40) of the second control circuit (32) while taking into account the intended mass flow (SMS) and the actual mass flow (IMS), and h) performing, the movement (18) of the robot arm (16), or, the basis of the at least one movement parameter (BP). The invention also relates to a device (2) for carrying out the above method.

12 Claims, 3 Drawing Sheets

(56) References Cited

U.S. PATENT DOCUMENTS

| | | | | |
|---|---|---|---|---|
| 10,189,018 | B2* | 1/2019 | Kozlenko | B01L 3/0213 |
| 11,185,631 | B2* | 11/2021 | Shtram | A61M 5/14228 |
| 2004/0174862 | A1* | 9/2004 | Johnson | B05B 7/1472 |
| | | | | 370/352 |
| 2008/0071424 | A1* | 3/2008 | St. Jean | G01F 13/008 |
| | | | | 700/282 |
| 2013/0199663 | A1* | 8/2013 | Newbold | G01G 19/32 |
| | | | | 222/77 |
| 2016/0297662 | A1* | 10/2016 | Baumgartner | B67C 3/286 |
| 2016/0334429 | A1* | 11/2016 | Abe | G01N 35/0099 |
| 2016/0378122 | A1* | 12/2016 | Guirguis | G01F 1/76 |
| | | | | 137/392 |
| 2017/0023598 | A1* | 1/2017 | Miyauchi | B25J 9/1682 |
| 2017/0292101 | A1* | 10/2017 | Yori | B25J 9/042 |
| 2017/0370956 | A1* | 12/2017 | Hurwitz | G06V 20/66 |
| 2018/0056286 | A1 | 3/2018 | Zucchelli | |

FOREIGN PATENT DOCUMENTS

| | | |
|---|---|---|
| EP | 3088141 A2 | 11/2016 |
| EP | 3088141 A3 | 2/2017 |
| WO | 9501911 A1 | 1/1995 |

OTHER PUBLICATIONS

Kingdraki (2007) "Kuka Roboter schenkt ein Weizen (Weissbier) ein," located at https://www.youtube.com/watch?=08VqCqpfWrk, last visited on Sep. 1, 2016.

Löffler, D. (2012) "Hefeweizen Einschenkroboter, beer pouring robot," located at https://www.youtube.com/watch?v=M1tbAKFXRtk last visited on Sep. 1, 2016.

* cited by examiner

METHOD FOR TRANSFERRING A POURABLE MEDIUM

CROSS-REFERENCE TO RELATED APPLICATIONS

This application is a national stage application under 35 U.S.C. § 371 of International Application No. PCT/EP2019/082058, filed internationally on Nov. 21, 2019, which claims the benefit of European Application No. 18208802.1, filed Nov. 28, 2018.

The invention relates to a method for transferring a pourable medium from a first vessel into a second vessel by means of a robotic arm.

People are very dexterous in the handling and manipulation of pourable media and, when handling, use the physical properties, such as, for example, the simple change in shape of the medium. Even small children playing with water or in the sandpit practice the movement with which water or sand can be poured from one bucket into another bucket.

By contrast, such a movement is a far more complex task for a robotic arm. The planning and execution of movements for manipulation of objects is therefore a central problem in robotics. For example, the planning of a collision-free path for transfer of an object from a starting position to a target position is one of the core tasks in automated assembly and production work. However, the planning of movements is generally limited to the handling of rigid objects, since simple mathematical models can be used here. However, these mathematical models fail in the case of handling deformable objects or pourable media.

EP 3 088 141 A2 discloses a solution for transfer of a pourable medium from a first vessel into a second vessel by means of a force-controlled robotic arm, wherein movement of the robotic arm is controlled by at least one movement parameter, wherein a first vessel (bottle) is gripped by means of the robotic arm, a second vessel (serving vessel) is positioned in a position for filling, and the first vessel is positioned and oriented such that at least some of the medium to be poured flows into the second vessel. The robotic arm comprises at least one sensor which is configured to ascertain forces in the vertical direction; with the aid of the sensor, the vessel gripped by the robotic arm can be weighed, and its actual filling mass can thus be determined. Pour-out is controlled according to this; in particular, residual pouring of the first vessel is checked. In other words, the first vessel is completely emptied. The robotic arm is capable of handing over the gripped vessel. Successful handover is also controlled with the aid of the above-mentioned sensor.

Many problems occur when handling and transferring pourable media with a robotic arm, for example spillage of some of the medium due to movements that are executed quickly or unsteadily. Furthermore, the transfer of a defined volume or defined mass of the medium by a tipping movement is a huge challenge for a robotic arm, especially if the process only tolerates minor deviations between the defined amount and the transferred amount.

The precise pouring of a mass of a medium, which mass is to be defined, is not dealt with by EP 3 088 141 A2.

Proceeding from this, it is an object of the invention to provide a solution with which a robotic arm can reliably transfer a mass of a pourable medium, which mass is to be defined, from one vessel into another vessel.

This object is achieved by the subject matter of claim 1. Preferred developments are found in the dependent claims.

The invention thus provides a method for transferring a pourable medium from a first vessel into a second vessel by means of a robotic arm, wherein movement of the robotic arm is controlled by at least one movement parameter, comprising the following method steps:

a) positioning the first vessel on the robotic arm such that a mass flow rate of the medium from the first vessel is changeable by the movement of the robotic arm, b) positioning the second vessel such that medium poured out of the first vessel gets into the second vessel essentially by the effect of gravity, c) defining the mass of the medium that is to be filled into the second vessel as the target filling mass, d) determining the mass of the medium that has been filled into the second vessel as the actual filling mass, and also the change in the actual filling mass of the medium over time as the actual mass flow rate, preferably by means of a balance, e) calculating a manipulated mass flow rate as the manipulated variable of a first control loop, taking into account the actual filling mass and the target filling mass, f) using the manipulated variable of the first control loop as the reference variable of a second control loop to the effect that the calculated manipulated mass flow rate is used as the target mass flow rate, g) calculating the at least one movement parameter of the robotic arm as the manipulated variable of the second control loop, taking into account the target mass flow rate and the actual mass flow rate, and h) executing the movement of the robotic arm on the basis of the at least one movement parameter.

The invention also provides a device for performing the above method, wherein the device comprises a robotic arm and a balance, the robotic arm is designed to move a vessel positioned on the robotic arm and containing a pourable medium such that a mass flow rate of the medium from the vessel is changeable and the movement of the robotic arm is controllable by at least one movement parameter.

Thus, the basic concept of the invention is that a mass of the medium, which mass is to be defined, is transferred from the first vessel into the second vessel by the movement of the robotic arm, the transferred mass corresponding to the target filling mass as closely as possible. To this end, the robotic arm executes movement by means of which the mass flow rate of the medium from the first vessel is changeable, the movement being controllable by at least one movement parameter. An essential aspect of the invention is that two control loops are used to control the at least one movement parameter of the robotic arm. With respect to the design of said control loops, the second control loop uses, as the manipulated variable, a variable which changes the mass flow rate from the first vessel, namely the at least one movement parameter of the robotic arm. Furthermore, the manipulated variable of the first control loop is used as the reference variable for the second control loop. What is thus used for the target value of the second control loop the target mass flow rate is the manipulated mass flow rate. From the standpoint of the second control loop, the first control loop is thus a target value giver, the target value of which changes only slowly. The first control loop therefore has as the manipulated variable the manipulated mass flow rate a variable which changes the filling mass of the second vessel. From the standpoint of the first control loop, the second control loop is thus a rapid actuator, the adjustment of which changes the filling mass in the second vessel. Owing to the two control loops, the method allows very accurate transfer of the pourable medium from the first vessel into the second vessel.

Here, the method has the advantage that a high degree of reproducibility is achieved in the case of repeated transfer of the same target filling mass the method thus has a high level of precision. Furthermore, owing to the control loops, the method also has a high level of accuracy, i.e., there is a high degree of concordance between the transferred mass of the medium and the target filling mass. Owing to automation by means of the robotic arm, the method is furthermore reliable and largely independent of human error. The method therefore also offers the advantage that dangerous media, poisonous media and/or media which are hazardous to health in some other way when handled by humans can be transferred without risking human health.

A method designed in this way is particularly suitable for use in a highly regulated environment, such as, for example, in the pharmaceutical industry or food production, especially in the area of quality control and/or chemical analysis. A highly regulated environment requires observance of, for example, guidelines for quality assurance of production and work processes (GMP guidelines), the fulfillment of which is often a mandatory requirement of the authorities.

The pourable medium can be, for example, a liquid, such as water, an organic solvent, a non-Newtonian fluid, or a mixture of different liquids. Non-Newtonian fluids exhibit deformation behavior that can no longer simply be described by Newton's laws. Examples of non-Newtonian fluids are blood, cement paste, quicksand and ketchup. Other substances may be contained in the liquid. These can be liquid or solid, dissolved, undissolved or dispersed. The liquid can have different viscosities, for example a high viscosity such as honey or oil, or a low viscosity such as water. Furthermore, the medium can also be a pourable solid, such as a coarse-grained or fine-grained powder. Furthermore, the medium can be granular material, pellets or chips, a mixture thereof also being possible. The medium can have different temperatures, for example room temperature, 4° C. or 45° C., as long as it is still pourable at that temperature. The medium is preferably water, a peptone phosphate buffer solution, and/or a yeast extract agar heated to about 45° C.

The mass of the medium can be determined by weight by means of the balance. The target filling mass is the mass of the medium that is to be transferred from the first vessel into the second vessel by the method. The mass flow rate of the medium is the change in the mass of the medium in the first vessel or in the second vessel over time. The mass is linked to the volume of the medium via the density of the medium. It is therefore also possible, in the case of a known density of the medium, for the portion of the medium that is to be transferred not to be defined as a mass and thus as a target filling mass, but for a volume to be transferred, i.e., a target volume, to be defined. The mass of the medium is linked to the amount of substance via the substance amount-based mass or molar mass of the medium. It is therefore also possible, in the case of a known molar mass of the medium, for the portion of the medium that is to be transferred to be defined as a target amount of substance.

The first and/or the second vessel can in principle be any type of vessel that is suitable for accommodating a pourable medium. The geometry of the first and/or second vessel can in principle be as desired. The first and/or second vessel preferably has an at least sectionally planar base, by means of which the first and/or second vessel can securely stand on an even plane, such as a table. The first and/or second vessel can have any desired capacity, for example 250 ml, 500 ml or 1 l. The first and/or second vessel is preferably a bottle, it being possible for the bottle to be closable. For example, the bottle can be a glass bottle with a screw cap. Further preferably, the bottle is a laboratory glass bottle that has a standardized thread, for example a GL45 thread. Furthermore, the first and/or second vessel can be a measuring beaker, an Erlenmeyer flask and/or a Petri dish.

In the context of the invention, a robotic arm is to be understood to mean a device which is designed to physically interact with the environment in order to perform mechanical work. The robotic arm can have multiple members connected by joints, it being possible for the joints to be adjusted by drives. The robotic arm can, for example, comprise a gripping system, by means of which the first vessel can be positioned on the robotic arm. In principle, it is possible for the robotic arm to be manually controlled. However, it is preferred that the movement of the robotic arm is controlled by input and/or programming. For this purpose, the movement of the robotic arm can be controlled by at least one movement parameter. For example, a movement parameter can be a speed with which the robotic arm adjusts one of its joints.

The method for transferring provides multiple method steps, wherein the vessels are appropriately positioned and the mass to be transferred is defined before the medium is transferred. Here, the first vessel is positioned on the robotic arm such that the mass flow rate of the medium from the first vessel is changeable by the movement of the robotic arm. The positioning of the vessels can comprise gripping of the vessels by means of a gripping system on the robotic arm. For example, a gripper can grip a closable bottle with a thread on the neck and/or thread. This has the advantage that positioning is particularly simple, since the thread has a standardized dimension. The mass flow rate of the medium is the change in the mass of the medium over time. For example, a tipping or rotating movement can cause the medium in the first vessel to flow out of the vessel. The mass flow rate passing out of the first vessel can, for example, be changed via the size of the tipping angle. Furthermore, the second vessel is positioned such that medium poured out of the first vessel gets into the second vessel essentially through the effect of gravity. What is meant here by the medium getting into the second vessel essentially through the effect of gravity is that the medium is not transported against gravity, though the medium need not get into the second vessel directly, but can be diverted on its way there, for example by means of a hose or a channel through which the medium is transferred. The second vessel is preferably positioned under the first vessel, so that the medium passing out of the first vessel can be readily collected by the second vessel. A target filling mass of the second vessel can, for example, be defined via input or programming of the target filling mass. Alternatively, it is conceivable that the target filling mass is automatically defined by the method depending on the second vessel and/or the pourable medium.

After the vessels have been appropriately positioned and the mass to be transferred has been defined, the actual filling mass and the change in the actual filling mass over time, that is to say the actual mass flow rate, are preferably determined by means of a balance. The actual filling mass and the actual mass flow rate can assume different values that change over the time the medium is transferred. Furthermore, the values at the start of the transfer of the medium can also be zero. In the further course of the method, the at least one movement parameter is controlled by the two control loops on the basis of these two actual values, inter alia, and the movement of the robotic arm is executed accordingly. As a result of the movement of the robotic arm, a mass of the medium is transferred into the second vessel, the transferred mass corresponding to the target filling mass as closely as possible.

With respect to the movement of the robotic arm, what is provided according to a preferred development of the invention is that the movement of the robotic arm comprises a rotating movement around an axis of rotation, the axis of rotation being substantially perpendicular to the effect of gravity. The first vessel is preferably positioned on the robotic arm such that, as a result of a rotating movement of the robotic arm, the first vessel executes a tipping or rotating movement which leads to the mass flow rate from the first vessel being changed. The axis of rotation of the rotating movement of the robotic arm is thus substantially perpendicular to the effect of gravity, or in other words: the axis of rotation of the robotic arm is substantially horizontal. The rotating movement is a movement that can be easily controlled by means of the at least one movement parameter. This therefore leads to a method that is particularly easy to implement.

In this connection, what is provided according to a preferred development of the invention is that the at least one movement parameter of the movement of the robotic arm comprises an angle of rotation, a duration of a constant angle of rotation and/or an angular speed of the angle of rotation of the robotic arm. These parameters completely characterize a rotating movement around an axis. For the transfer of the medium from the first vessel into the second vessel, there is thus no need to calculate a translation-comprising and possibly complex movement path of the robotic arm. Instead, the method preferably controls said movement parameters describing a rotating movement. Particularly preferably, the manipulated variable of the second control loop is the angular speed of the angle of rotation of the robotic arm. As a result, just one manipulated variable can achieve complete implementation of the rotating movement, with the method adjusting, via the control, the angular speed in each case such that the desired target filling quantity is transferred into the second vessel.

In principle, the controllers in the two control loops can be PID controllers (proportional-integral-derivative controller), which consist of the components of the P element, the I element and the D element. However, according to a preferred development of the invention, the first and/or the second control loop comprises a P controller. A P controller is a continuously linear controller that exclusively consists of a proportional part of the gain or attenuation. The output signal of the P controller is proportional to the input signal. Therefore, the manipulated variable of the first control loop the manipulated mass flow rate is preferably proportional to the deviation of the actual filling mass from the target filling mass and/or the manipulated variable of the second control loop the at least one movement parameter is preferably proportional to the deviation of the actual mass flow rate from the target mass flow rate. Both control loops particularly preferably comprise a P controller.

With respect to the design of the control loops, what is provided according to a preferred development of the invention is that the first and the second control loop form a cascade control together. The principle of cascade control consists in the hierarchical nesting of control loops. The first control loop is preferably the outer control loop and the second control loop is preferably the inner control loop. The target value or the reference variable of the inner control loop consists of the manipulated variable of the outer control loop. The entire controlled system is thereby subdivided into smaller, more easily controllable sections, which increases the control accuracy compared to a directly acting controller. Owing to the cascade control, the method allows accurate transfer of the pourable medium from the first vessel into the second vessel.

According to a further preferred development of the invention, the second vessel is positioned on a balance in step b) of the method. The second vessel is thus not just positioned such that medium poured out of the first vessel gets into the second vessel essentially by the effect of gravity, but rather stands on a balance. This makes the determination of the actual filling mass and the determination of the change in the actual filling mass over time, i.e., the determination of the actual mass flow rate, in step d) particularly simple, since the vessel does not need to be shifted or repositioned again.

In this connection, what is provided according to a further preferred development of the invention is that in step b) of the method the second vessel is positioned such that the medium poured out of the first vessel completely gets into the second vessel. The control of the at least one movement parameter is particularly accurate when the medium leaving the first vessel is completely collected by the second vessel. The mass flow rate leaving the first vessel is therefore identical in value to the mass flow rate entering the second vessel.

In principle, it is possible for steps d) to h) of the method, i.e., determining the actual filling mass and the actual mass flow rate, calculating the manipulated mass flow rate, using the manipulated mass flow rate as the target mass flow rate, calculating the at least one movement parameter and executing the movement, to be performed only at a few discrete points in time during the transfer. However, in a preferred development of the invention, steps d) to h) of the method are performed continuously during the transfer of the pourable medium. The method is therefore one which provides virtually instantaneous feedback of the actual filling mass and the actual mass flow rate. This makes it possible to achieve a particularly high level of accuracy of the transfer, since the transfer of the pourable medium is performed in a controlled manner. The second vessel thus preferably stands on the balance during the transfer, the measurement results of the balance being continuously returned to the control loops.

In order to make the method as reliable as possible, what is provided according to a preferred development of the invention is that the method additionally comprises the step of determining the empty mass of the second vessel. This can, for example, be performed by means of the balance. The empty mass of the second vessel is the mass of the second vessel before the medium was transferred from the first vessel into the second vessel. The second vessel can be unfilled or empty when determining the empty mass, or else be filled or partially filled with something. It is possible here for the second vessel to be filled with a different medium or with the same medium as the medium to be transferred. Determining the empty mass of the second vessel has the advantage that it can be easily identified as to whether the defined target filling mass can be taken up by the second vessel. It is therefore ensured that the second vessel is not poured over.

In connection with a method that is as reliable as possible, what is provided according to a preferred development of the invention is that the method additionally comprises one or more of the following steps, determining the mass of the first vessel,
determining the geometry of the first vessel, determining the nature of the medium and/or determining the viscosity of the medium and the first and/or second control loop and/or the at least one movement parameter is adjustable taking into account one or more of these values. For example, by determining the mass of the first vessel, for example by means of the balance, it is possible to establish how much medium is in the first vessel. It can therefore be ensured that the defined target filling mass that is to be transferred into the second vessel is not greater than the mass present in the first vessel. Furthermore, by determining the geometry in combination with the mass of the first vessel, it is possible to ascertain the fill level of the medium in the first vessel.

A camera, for example, can be used to determine the geometry. Alternatively, the vessel can be provided with a machine-readable label, for example a barcode or with an RFID chip. This can be used to identify the vessel and to therefore determine the geometry of the vessel. The information about the geometry of the vessel can be incorporated in the control of the at least one movement parameter. For example, movement can be quickened at the start if the fill level is low and a large angle of rotation has to be achieved until there is a mass flow rate from the first vessel. Furthermore, the nature of the medium and/or the viscosity of the medium can be taken into account. For example, in the case of a medium having high viscosity, there may be a time delay between the medium leaving the first vessel and reaching the second vessel. This flow behavior can be taken into account in the control loops and/or for the at least one movement parameter, so that there is no overshoot of the control. The nature and/or viscosity of the medium can, for example, be determined via the machine-readable label of the first vessel.

According to a preferred development of the invention, the device for performing the method comprises two control loops which form a cascade control and which are designed to control the at least one movement parameter. The cascade control makes it possible to subdivide the entire controlled system into smaller, more easily controllable sections, which increases the control accuracy compared to a directly acting controller. The cascade control thus leads to accurate transfer of the pourable medium from the first vessel into the second vessel.

With respect to the design of the device for performing the method, it is furthermore preferred that the robotic arm comprises a gripper which is designed to grip around the first and/or the second vessel. Preferably, the gripper is a two-finger gripper, especially an adaptive two-finger gripper, since its adaptivity means that it can grip angular vessels in a parallel manner and round vessels in an enclosing manner. Furthermore, the gripper has sufficient gripping force in order to securely grip the first vessel and the second vessel even when filled.

The invention will be more particularly elucidated below on the basis of a preferred exemplary embodiment with reference to the drawings.

Figure 1:
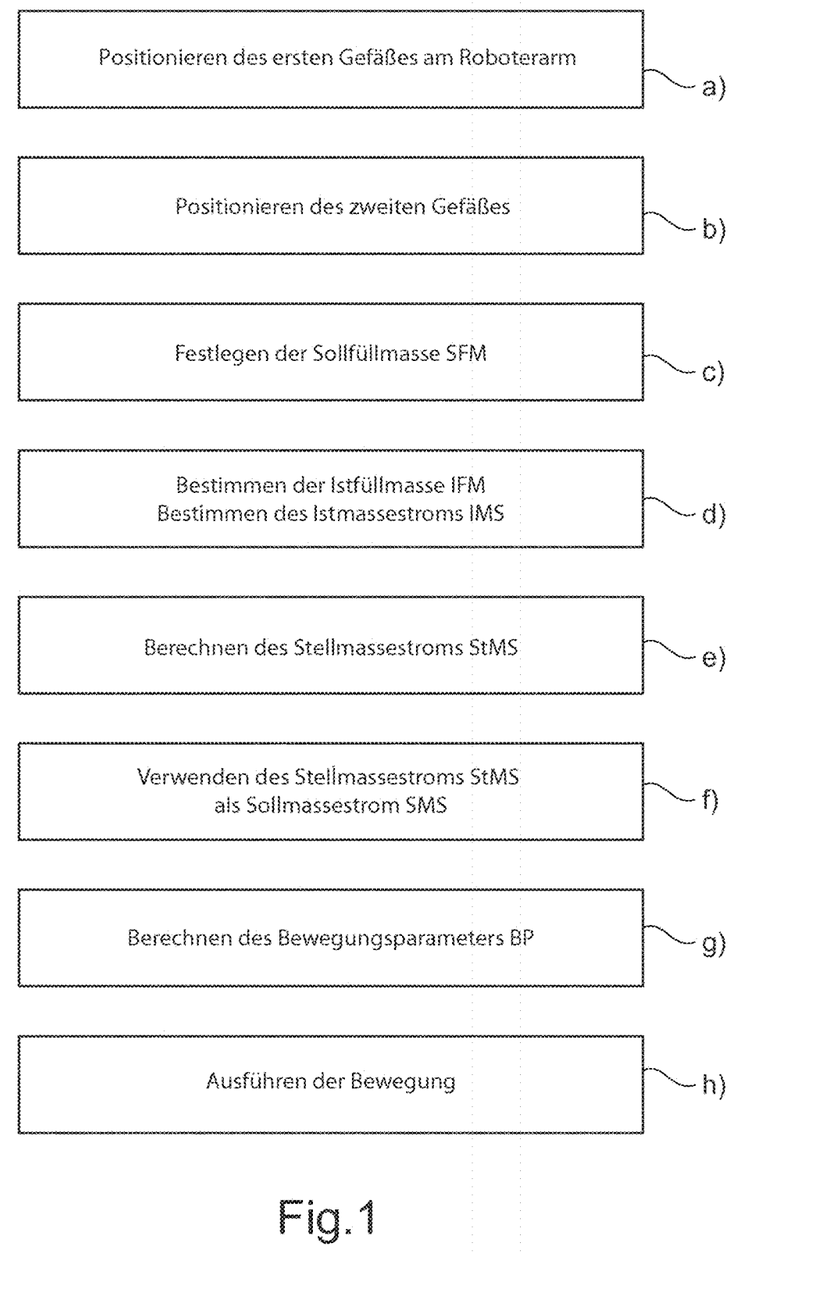
FIG. 1 shows a flow chart containing the steps of the method for transferring a pourable medium from a first vessel into a second vessel according to a preferred exemplary embodiment of the invention, FIGS. 2 *a, b* and *c* show schematic depictions of the device for executing the method according to a preferred exemplary embodiment of the invention

FIG. 1 shows a flow chart containing the steps of the method for transferring a pourable medium 10 from a first vessel 12 into a second vessel 14 by means of a robotic arm 16 according to a preferred exemplary embodiment of the invention. The method is executed by a device 42 having a robotic arm 16, said device 42 being shown schematically in FIGS. 2 *a, b* and *c* with execution of selected steps of the method.

Figure 2A:
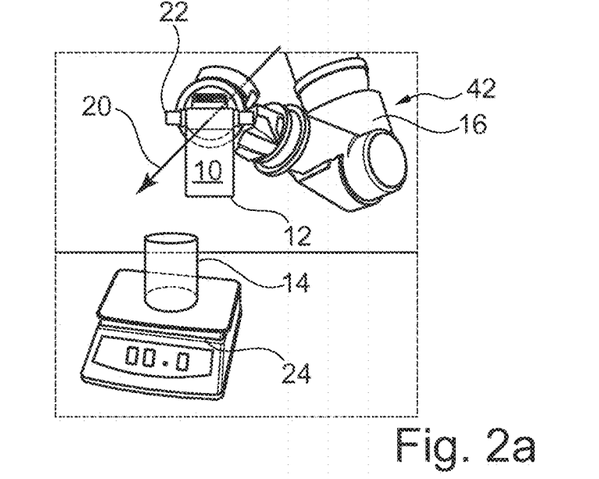
Figure 2B:
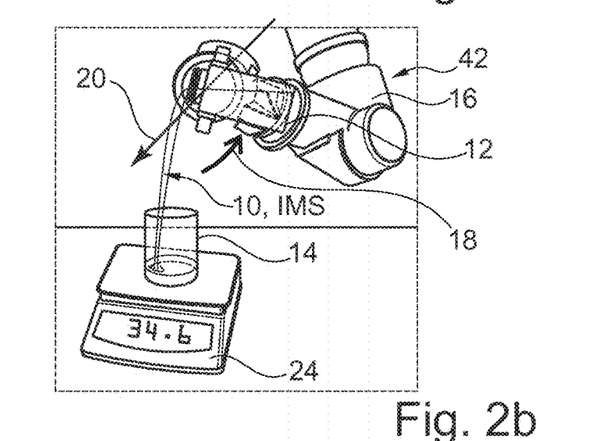
Figure 2C:
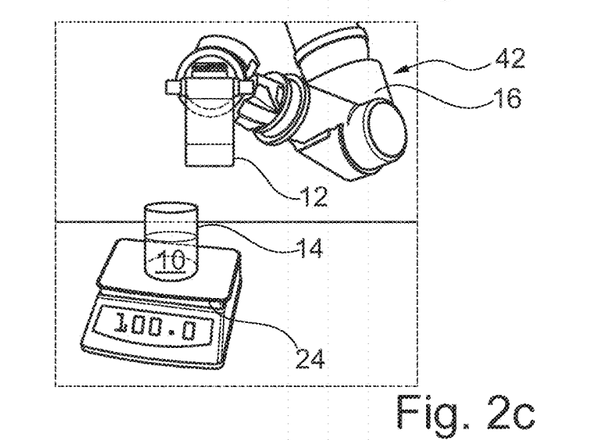

The steps of the method will be elucidated below with reference to the flow chart in FIG. 1, the device 42 in FIG. 2 and the control in FIG. 3.

The method comprises step a) positioning the first vessel 12 on the robotic arm 16 such that a mass flow rate of the medium 10 from the first vessel 10 is changed by the movement 18 of the robotic arm 16. As depicted in FIG. 2, the robotic arm 16 has a gripper 22 for positioning the first vessel 12. The movement 18 which changes the mass flow rate is a rotating movement 18 of the robotic arm 16 around an axis of rotation 20 which is perpendicular to the effect of gravity.

In a further step b) of the method, the second vessel 14 is positioned such that medium 10 poured out of the first vessel 12 gets into the second vessel 14 essentially by the effect of gravity. According to the preferred exemplary embodiment of the invention described here, the second vessel 14 is positioned on a balance 24, as depicted in FIGS. 2 *a, b* and *c*.

After the mass of the medium 10 that is to be filled into the second vessel 14 is defined as the target filling mass SFM in a further step c) of the method, steps a) to c) of the method, which are preparatory actions, have been performed. The target filling mass SFM is 100 g in this example. FIG. 2*a* shows the state of the device 42 after steps a) to c) have been performed. According to the preferred exemplary embodiment of the invention described here, the medium 10 is a liquid, namely water.

The following method steps are performed continuously during the transfer of the pourable medium 10. In step d), the balance 24 is used to determine the mass of the medium 10 that has been filled into the second vessel 14 as the actual filling mass IFM and to determine the change in the actual filling mass of the medium 10 over time as the actual mass flow rate IMS. In step e), the method then calculates a manipulated mass flow rate StMS as the manipulated variable 26 of a first control loop 28, taking into account the actual filling mass IFM and the target filling mass SFM. Said manipulated variable 26 of the first control loop 28 is used in step f) as the reference variable 30 of a second control loop 32 to the effect that the calculated manipulated mass flow rate StMS is used as the target mass flow rate SMS.

Figure 3:
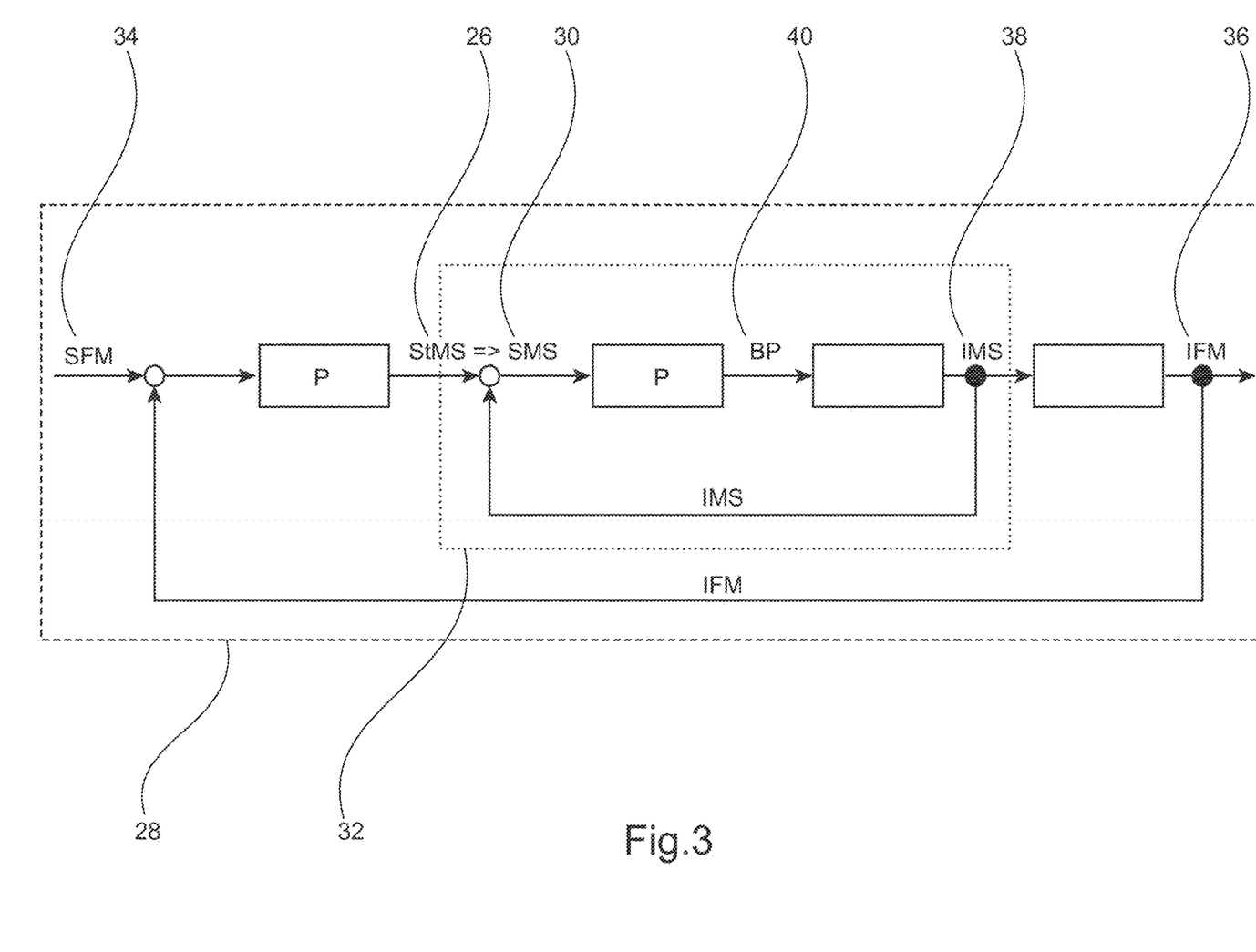
FIG. 3 shows a schematic depiction of two control loops used for control of the at least one movement parameter according to a preferred exemplary embodiment of the invention.

The two control loops 28, 32 are schematically depicted in FIG. 3. A cascade control is concerned, with the first control loop 28 forming the outer control loop, which has the target filling mass SFM as the reference variable 34 and the actual filling mass IFM as the controlled variable 36. The second control loop 32 forms the inner control loop of the cascade control, which has the target mass flow rate SMS as the reference variable 30 and the actual mass flow rate IMS as the controlled variable 38.

In a further method step g), the at least one movement parameter BP of the robotic arm 16 is calculated as the manipulated variable 40 of the second control loop 32, taking into account the target mass flow rate SMS and the actual mass flow rate IMS. Both control loops 28, 32 have a P controller, i.e., the manipulated mass flow rate StMS is proportional to the deviation of the actual filling mass IFM from the target filling mass SFM and the at least one movement parameter BP is proportional to the deviation of the actual mass flow rate IMS from the target mass flow rate SMS.

In a further step h), the robotic arm 16 executes the movement 18 on the basis of the at least one movement parameter BP. According to the preferred exemplary embodiment described here, the at least one movement parameter BP is the angular speed of the rotating movement 18 of the robotic arm 16. FIG. 2*b*) shows the device 42 during the transfer of the medium 10, the angular speed of the rotating movement 18 being controlled by the control of the two control loops 28, 32. The control leads to the movement 18 substantially corresponding to a tipping movement that is executed there and back. FIG. 2*c*) shows the state of the device 42 toward the end of the method when the desired target filling quantity SFM of the medium 10, in this case 100 g, has been transferred into the second vessel 14.

LIST OF REFERENCE SIGNS

- 10 Medium
- 12 First vessel
- 14 Second vessel
- 16 Robotic arm
- 18 Movement, rotating movement
- 20 Axis of rotation
- 22 Gripper
- 24 Balance
- 26 Manipulated variable of the first control loop
- 28 First control loop
- 30 Reference variable of the second control loop
- 32 Second control loop
- 34 Reference variable of the first control loop
- 36 Controlled variable of the first control loop
- 38 Controlled variable of the second control loop
- 40 Manipulated variable of the second control loop
- 42 Device
- SFM Target filling quantity (reference variable of the first control loop)
- IFM Actual filling quantity (controlled variable of the first control loop)
- StMS Manipulated mass flow rate (manipulated variable of the first control loop)
- SMS Target mass flow rate (reference variable of the second control loop)
- IMS Actual mass flow rate (controlled variable of the second control loop)
- BP Movement parameter (manipulated variable of the second control loop)

The invention claimed is:

1. A method for transferring a mass of a pourable medium (10), with which filling is to be carried out, from a first vessel (12) into a second vessel (14) by means of a robotic arm (16), wherein movement (18) of the robotic arm (16) is controlled by at least one movement parameter (BP), comprising the following method steps:
    a) positioning the first vessel (12) on the robotic arm (16) such that a mass flow rate of the medium (10) from the first vessel (12) is changeable by the movement (18) of the robotic arm (16) around an axis of rotation (20),
    b) positioning the second vessel (14) such that medium (10) poured out of the first vessel (12) gets into the second vessel (14) essentially by the effect of gravity,
    c) defining the mass of the medium (10) that is to be filled into the second vessel (14) as the target filling mass (SFM),
    d) determining the mass of the medium (10) that has been filled into the second vessel (14) as the actual filling mass (IFM), and also the change in the actual filling mass (IFM) of the medium (10) into the second vessel (14) over time as the actual mass flow rate (IMS),
    e) calculating a manipulated mass flow rate (StMS) as a manipulated variable (26) of a first control loop (28), taking into account the actual filling mass (IFM) and the target filling mass (SFM),
    f) using the manipulated variable (26) of the first control loop (28) as a reference variable (30) of a second control loop (32) to the effect that the calculated manipulated mass flow rate (StMS) is used as the target mass flow rate (SMS),
    g) calculating the at least one movement parameter (BP) of the robotic arm (16) as a manipulated variable (40) of the second control loop (32), taking into account the target mass flow rate (SMS) and the actual mass flow rate (IMS), wherein the at least one movement parameter characterizes the rotating movement around an axis, and
    h) executing the movement (18) of the robotic arm (16) on the basis of the at least one movement parameter (BP).

2. The method of claim 1, wherein the axis of rotation (20) is substantially perpendicular to the effect of gravity.

3. The method of claim 1, wherein the at least one movement parameter (BP) of the movement (18) of the robotic arm (16) comprises an angle of rotation, a duration of a constant angle of rotation and/or an angular speed of the angle of rotation of the robotic arm (16).

4. The method of claim 1, wherein the first and/or the second control loop (28, 32) comprises a P controller.

5. The method of claim 1, wherein the first and the second control loop (28, 32) form a cascade control together.

6. The method of claim 1, wherein the second vessel (14) is positioned on a balance (24) in step b) of the method.

7. The method of claim 1, wherein in step b) of the method the second vessel (14) is positioned such that the medium (10) poured out of the first vessel (12) completely gets into the second vessel (14).

8. The method of claim 1, wherein steps d) to h) of the method are performed continuously during the transfer of the pourable medium (10).

9. The method of claim 1, wherein the method additionally comprises the step of determining an empty mass of the second vessel (14).

10. The method of claim 1, wherein the method additionally comprises one or more of the following steps,
    determining the mass of the first vessel (12),
    determining the geometry of the first vessel (12),
    determining the nature of the medium (10) and/or
    determining the viscosity of the medium (10)
    and the first and/or second control loop (28, 32) and/or the at least one movement parameter (BP) is adjusted taking into account one or more of these values.

11. A device (42) for performing the method of claim 1, wherein the device comprises a robotic arm (16) for gripping a first vessel (12) and a balance (24) for measuring a mass flow rate of a medium (10) into a second vessel (14), the robotic arm (16) is designed to move the vessel (12) positioned on the robotic arm (16) and containing the pourable medium (10) by a rotating movement (18) of the robotic arm (16) around an axis of rotation (20) such that a mass flow rate of the medium (10) from the vessel (12) is changeable and the movement (18) of the robotic arm (16) is controllable by at least one movement parameter (BP) with the aid of the measurement made by the balance (24).

12. The device (42) of claim 11, wherein the device comprises two control loops (28, 32) which form a cascade control and which are designed to control the at least one movement parameter (BP).

\* \* \* \* \*

UNITED STATES PATENT AND TRADEMARK OFFICE
CERTIFICATE OF CORRECTION

| | | |
|---|---|---|
| PATENT NO. | : 11,911,913 B2 | Page 1 of 3 |
| APPLICATION NO. | : 17/297370 | |
| DATED | : February 27, 2024 | |
| INVENTOR(S) | : Leslaw Mleczko et al. | |

It is certified that error appears in the above-identified patent and that said Letters Patent is hereby corrected as shown below:

On the Title Page

Delete the title page and substitute therefore with the attached title page consisting of the corrected illustrative figure.

In the Drawings

Please replace FIG. 1 with FIG. 1 as shown on the attached drawing sheet.

Signed and Sealed this
Thirtieth Day of September, 2025

John A. Squires
*Director of the United States Patent and Trademark Office*

CERTIFICATE OF CORRECTION (continued)

(12) United States Patent
Mleczko et al.

(10) Patent No.: US 11,911,913 B2
(45) Date of Patent: Feb. 27, 2024

(54) METHOD FOR TRANSFERRING A POURABLE MEDIUM

(71) Applicant: Bayer Aktiengesellschaft, Leverkusen (DE)

(72) Inventors: Leslaw Mleczko, Dormagen (DE); Armin Schweiger, Bergisch Gladbach (DE); Kathrin Wegener, Neuss (DE); Carl-Helmut Coulon, Bonn (DE)

(73) Assignee: BAYER AKTIENGESELLSCHAFT, Leverkusen (DE)

(*) Notice: Subject to any disclaimer, the term of this patent is extended or adjusted under 35 U.S.C. 154(b) by 452 days.

(21) Appl. No.: 17/297,370

(22) PCT Filed: Nov. 21, 2019

(86) PCT No.: PCT/EP2019/082058
§ 371 (c)(1),
(2) Date: May 26, 2021

(87) PCT Pub. No.: WO2020/109126
PCT Pub. Date: Jun. 4, 2020

(65) Prior Publication Data
US 2022/0024040 A1   Jan. 27, 2022

(30) Foreign Application Priority Data
Nov. 28, 2018   (EP) .................................. 18208802

(51) Int. Cl.
*B25J 9/16*   (2006.01)

(52) U.S. Cl.
CPC .......... *B25J 9/1679* (2013.01); *B25J 9/1628* (2013.01); *G05B 2219/31376* (2013.01); *G05B 2219/39001* (2013.01)

(58) Field of Classification Search
CPC ............ B25J 9/1679; B25J 9/1628; G05B 2219/31376; G05B 2219/39001
See application file for complete search history.

(56) References Cited

U.S. PATENT DOCUMENTS 4,630,755 A * 12/1986 Campbell ............ G05D 7/0605
  222/196
4,976,377 A * 12/1990 Higuchi ............... G01G 13/285
  706/900

(Continued)

FOREIGN PATENT DOCUMENTS

| CN | 106799734 A | 6/2017 |
| CN | 106799737 A | 6/2017 |

(Continued)

OTHER PUBLICATIONS

International Search Report dated Feb. 13, 2020, for PCT Application No. PCT/EP2019/082058 filed on Nov. 21, 2019, 6 pages.
(Continued)

*Primary Examiner* — Jeff A Burke
*Assistant Examiner* — Mohamad O El Sayah
(74) *Attorney, Agent, or Firm* — MORRISON & FOERSTER LLP

(57) ABSTRACT

The invention relates to a method for transferring a pourable medium (10) from a first vessel (12) into a second vessel (14), by means of a robot arm (16), wherein a movement 118 of the robot arm (16) can be controlled by at least one movement parameter (BP), including, inter alia, the following method steps: d) determining the mass of the medium (10) transferred into the second vessel (14) as an actual filling mass (IFM), and also the variation over time of the actual filling mass (IFM) of the medium (30; as an actual mass flow (IMS), by means of a balance 124), c) calculating a correcting mass flow (StMS) as a correcting variable (26) of a first control circuit (28) while taking into account the
(Continued)

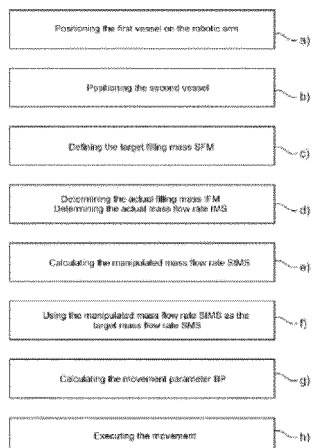

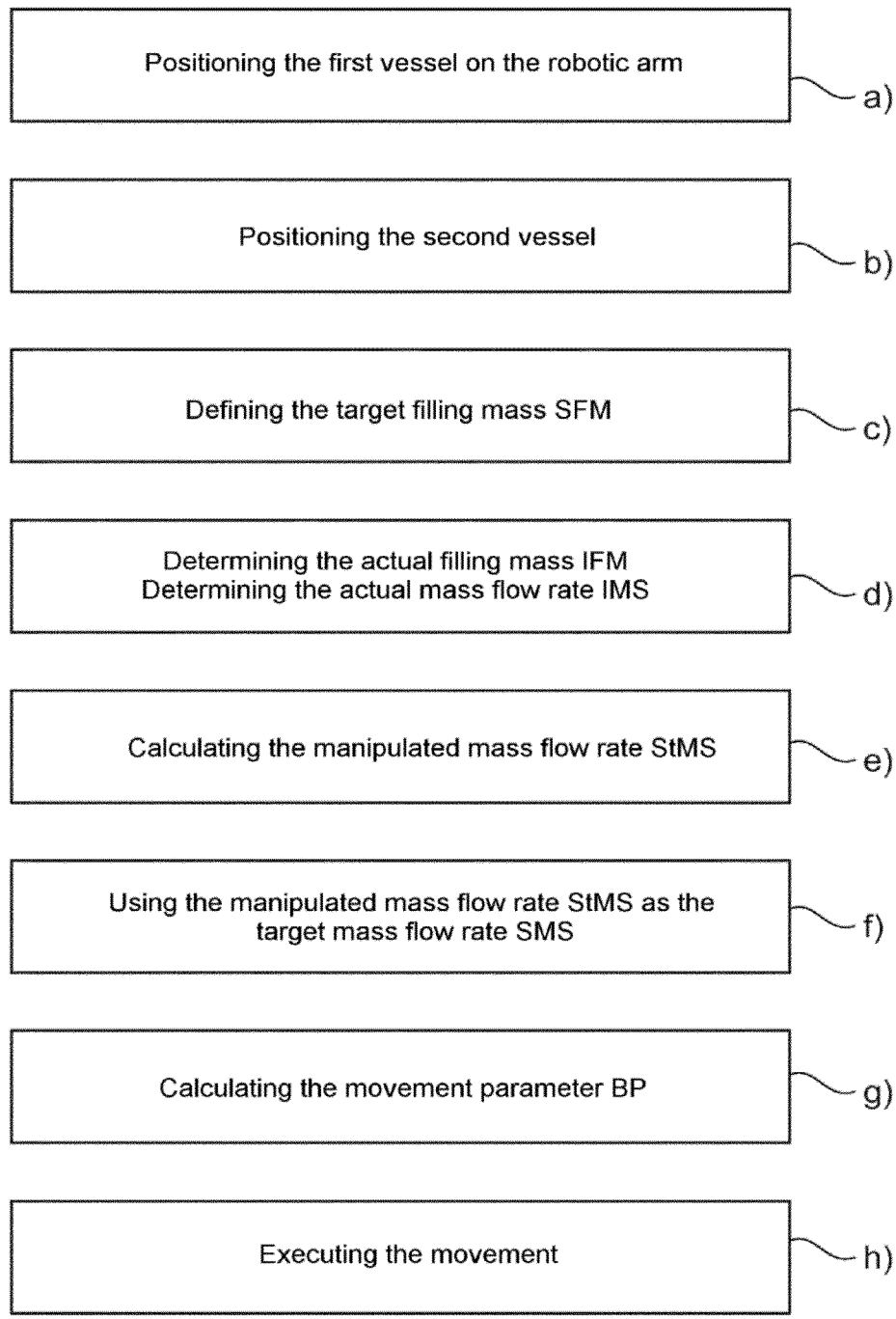
Fig.1